No. 788,666. PATENTED MAY 2, 1905.
T. J. MOSURE.
AUTOMATIC STOCK FOUNTAIN.
APPLICATION FILED AUG. 8, 1904.
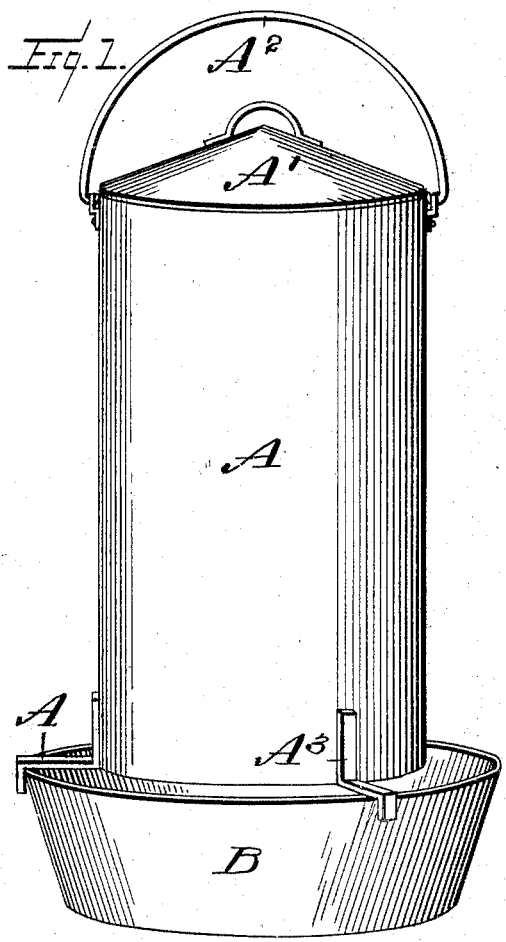
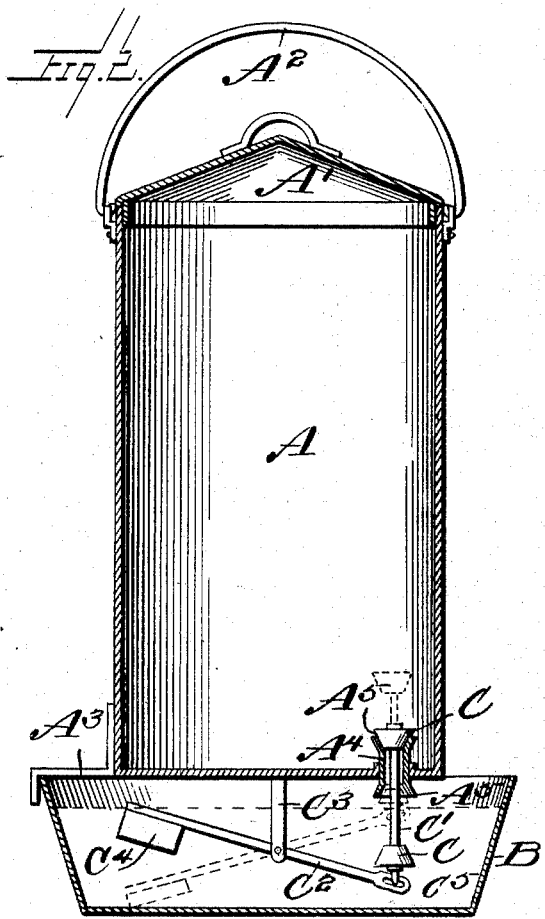
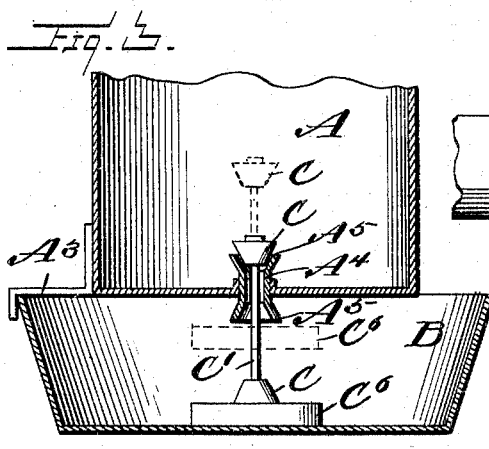
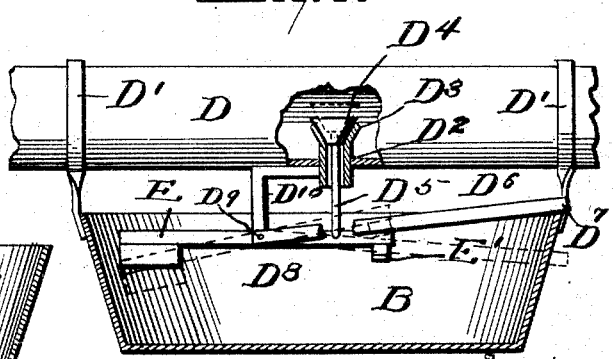
Inventor
Thomas J. Mosure,
By E. B. Stocking
Attorney
Witnesses
W. F. Doyle
Alfred T. Gage No. 788,666.

Patented May 2, 1905.

UNITED STATES PATENT OFFICE.

THOMAS J. MOSURE, OF EAST LIVERPOOL, OHIO.

AUTOMATIC STOCK-FOUNTAIN.

SPECIFICATION forming part of Letters Patent No. 788,666, dated May 2, 1905.

Application filed August 8, 1904. Serial No. 220,046.

*To all whom it may concern:*

Be it known that I, THOMAS J. MOSURE, a citizen of the United States, residing at East Liverpool, in the county of Columbiana, State of Ohio, have invented certain new and useful Improvements in Automatic Stock-Fountains, of which the following is a specification, reference being had therein to the accompanying drawings.

This invention relates to an automatic stock-fountain, and particularly to a structure embodying a water-receptacle and drinking-pan separable from each other.

The invention has for an object to provide means by which the water from the receptacle will be automatically fed to the drinking-pan and when the receptacle and pan are separated the discharge-openings for the former will be automatically closed, so that the receptacle may be transported for refilling and when reassembled with the pan is in condition for operation by the float mechanism disposed within the pan.

Other and further objects and advantages of the invention will be hereinafter set forth, and the novel features thereof defined by the appended claims.

In the drawings, Figure 1 is a perspective of the invention. Fig. 2 is a central vertical section. Fig. 3 is a similar detail view of a modified form of the invention, and Fig. 4 is a similar view of another modification thereof.

Like letters of reference refer to like parts in the several figures of the drawings.

The letter A designates a liquid receptacle or reservoir of any suitable character or material—for instance, as here shown, provided with a cover $A'$ and handle $A^2$ to permit its transportation for refilling or otherwise.

Associated with the receptacle A, but separable therefrom, is a drinking-pan B of greater diameter than the receptacle, the latter being supported from the edge of the pan by means of legs $A^3$ or other suitable devices, so as to provide a space between the receptacle and edge of the pan, through which access may be had to the liquid within the latter.

In the form of invention shown in Fig. 1 the bottom of the receptacle A is provided with a valve-collar $A^4$, mounted in an aperture therein and having at its opposite ends valve-seats $A^5$, adapted to coöperate with the oppositely-disposed valves C, carried by the stem $C'$, which passes through the collar $A^4$. For the purpose of operating these valves by means of a float a float-lever $C^2$ is pivotally supported from the under side of the receptacle by means of a hanger $C^3$ and provided at one end with a float $C^4$ and at its opposite end with a suitable slotted connection $C^5$ at the lower end of the valve-stem $C'$. It will thus be seen that with the parts in the position shown by full lines in Fig. 2 the pan being filled to the proper height with water carries upward the float and closes the upper valve C, while when the water-level descends the float also moves downward, opening the upper valve and still retaining the lower valve open, as shown by dotted lines in Fig. 2. If the receptacle and pan be at any time separated for the purpose of refilling the former or otherwise, the removal of the float from its liquid-supporting means within the pan causes it to drop downward to its greatest length of travel and throw the lower valve C in contact with its seat, thus automatically retaining the liquid within the receptacle during transportation thereof.

In the modified form of the invention shown in Fig. 3 the pivoted float-operated lever is omitted and a float member $C^6$ applied to the lower end of the valve-stem $C'$, the other parts being similar in construction to that shown in Fig. 2. In this form the float rests upon the bottom of the pan B when the liquid is exhausted therefrom, thus opening the two valves to permit the passage of liquid from the receptacle to the pan, and as the level of liquid rises in the pan the float is carried upward into the position shown in dotted lines in Fig. 3, so as to close the lower valve. If the receptacle and pan be separated, the weight of the float brings the upper valve C in contact with its seat $A^5$ and prevents the escape of liquid from the receptacle.

In the modification shown in Fig. 4 the pan B is shown as supported from a pipe D or other liquid-receptacle by means of hanging-hooks $D'$, secured to the pan. This pipe is provided with a valve-collar $D^2$, provided with a seat $D^3$ at its upper portion to coöperate with a valve $D^4$, carried by a stem $D^5$, passing through the collar and connected to a float-lever E, pivotally mounted at $D^9$ upon a depending bracket $D^{10}$ and provided at one end with a lateral projection $E'$. A closing arm or weight $D^6$ is also pivotally mounted upon the pivot $D^9$ and at its free end $D^7$ is supported by the edge of the pan B and normally out of operative position. The float-lever, as shown by full lines in Fig. 4, retains the valve closed; but when the level of liquid in the pan falls the lever assumes the dotted-line position to admit more water to the pan, while when the pan and receptacle are separated the support for the closing arm or weight is removed and the latter falls into the position indicated by dotted lines in Fig. 4, thus overbalancing the float and retaining the valve in the closed position shown by full lines.

It will be obvious that changes may be made in the details of construction and configuration without departing from the spirit of the invention as defined by the appended claims.

Having described my invention and set forth its merits, what I claim, and desire to secure by Letters Patent, is—

1. A stock-fountain comprising a water-receptacle, a pan separable therefrom, a valved discharge-opening in the lower portion of said receptacle, a float mounted to operate said valve, and means controlled by said pan for automatically operating said valve to close said discharge-opening when the receptacle and pan are separated.

2. A stock-fountain comprising a water-receptacle, a pan separable therefrom, a valved discharge-opening in the lower portion of said receptacle, a float mounted to operate said valve, and means carried by the stem of said valve for automatically closing said discharge-opening when the receptacle and pan are separated.

3. In a stock-fountain, a water-receptacle, a pan upon which said receptacle is separably supported, a valve-collar in the bottom of said receptacle having seats at its opposite ends, a valve-stem extending through said collar and provided at its opposite ends with independent valves to respectively engage the opposite seats, and a float connected to said stem for operating the same.

4. In a stock-fountain, a water-receptacle, a pan upon which said receptacle is separably supported, a valve-collar in the bottom of said receptacle having seats at its opposite ends, a valve-stem extending through said collar and provided with oppositely-disposed valves, and a float-lever pivotally supported from the lower portion of said receptacle and connected to said stem.

In testimony whereof I affix my signature in presence of two witnesses.

THOMAS J. MOSURE

Witnesses:
CLARENCE E. DOUGLASS,
INA L. HOOBLER.